(12) United States Patent
Takamatsu et al.

(10) Patent No.: US 6,761,819 B2
(45) Date of Patent: Jul. 13, 2004

(54) WATER PURIFYING APPARATUS

(76) Inventors: Kuniaki Takamatsu, 55 Takamatsu, Kaminoyama-shi, Yamagata 999-3243 (JP); Nariko Ohara, 538-18, Ayameike Minami 7-chome, Nara-shi, Nara 631-0033 (JP)

( * ) Notice: Subject to any disclaimer, the term of this patent is extended or adjusted under 35 U.S.C. 154(b) by 145 days.

(21) Appl. No.: 10/233,144

(22) Filed: Aug. 30, 2002

(65) Prior Publication Data

US 2003/0192833 A1 Oct. 16, 2003

(30) Foreign Application Priority Data

Apr. 16, 2002 (JP) ........................................ 2002-113890

(51) Int. Cl.⁷ .............................. C01F 1/00; C01F 1/34
(52) U.S. Cl. ..................................... 210/198.1; 210/764
(58) Field of Search ................................ 210/748, 749, 210/764, 198.1, 205, 243; 204/554, 660

(56) References Cited

U.S. PATENT DOCUMENTS 6,110,424 A * 8/2000 Maiden et al. ................. 422/24
6,261,464 B1 * 7/2001 Herrington et al. .......... 210/758
6,579,495 B1 * 6/2003 Maiden ........................ 422/24

FOREIGN PATENT DOCUMENTS

| JP | 10-5767 | 1/1998 |
| JP | 11-87086 | 3/1999 |
| JP | 2896762 | 3/1999 |

* cited by examiner

*Primary Examiner*—Frank M. Lawrence
(74) *Attorney, Agent, or Firm*—Darby & Darby

(57) ABSTRACT

The water purifying apparatus can purify water at a high speed without using a chlorine family chemical substance. A glass container 31 with the both ends formed in a conical shape, in which negatively charged metallic silicon and smaller glass containers containing negatively charged metallic silicon are contained, is disposed at an end portion of a cylindrical storing unit 14 in which a motor 12 is stored. An end portion of the glass container 31 protrudes from the storing unit 14. The outer circumferential surface of the glass container 31 is coated with two copper plates 35a and 35a and an aluminum plate 35b which are aligned in a circumferential direction. The protruding end portion of the glass container 31 is dipped in water and is then rotated.

20 Claims, 15 Drawing Sheets

2700 rpm 8000 rpm

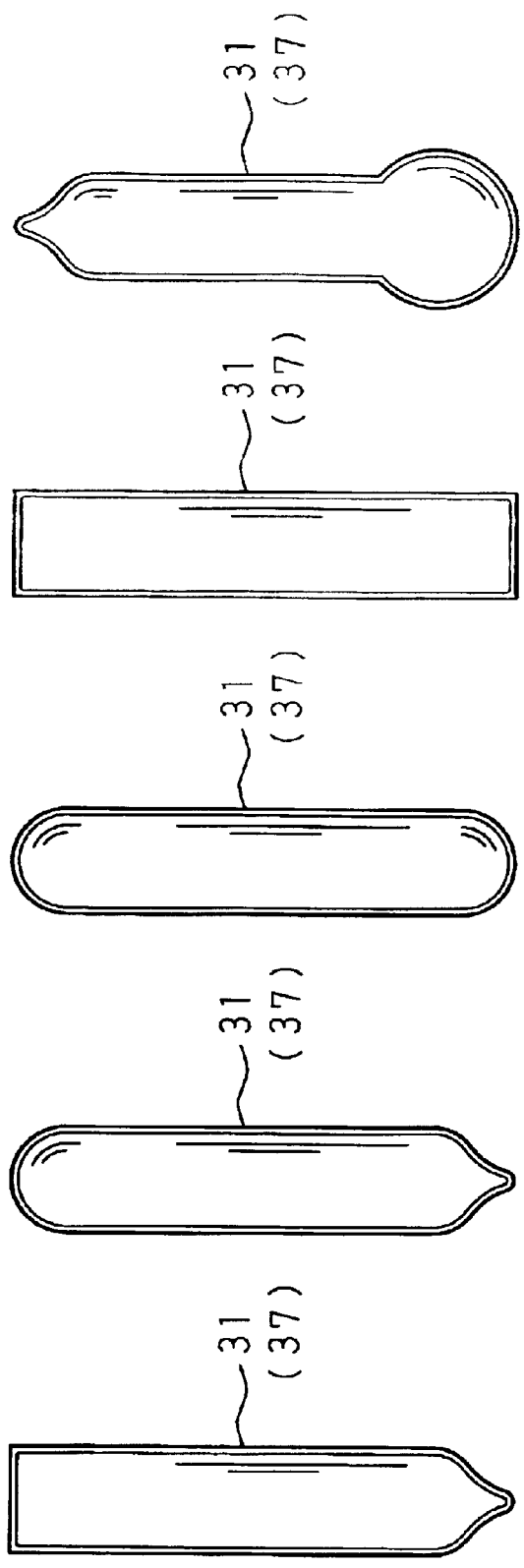

WATER PURIFYING APPARATUS

BACKGROUND OF THE INVENTION

1. Field of the Invention

The present invention relates to a water purifying apparatus to be used for purifying water.

2. Description of Related Art

City water including drinking water has conventionally been obtained by applying a necessary process to material water such as river water, underground water (raw water) or the like. In general, underground water has preferable quality free from objects to be eliminated, and is supplied through only a sterilization process. By contrast, river water undergoes a process for eliminating viscous colloid, algal plankton and natural contaminants, and a sterilization process. For the sterilization process, chlorine and hypochlorous acid are used. Water that satisfies quality standards as drinking water is supplied through such processes.

Quality of drainage discharged from plants or the like, which may mix into city water, is under the control of relevant regulations. However, drainage may sometimes be discharged without undergoing an appropriate process because of restrictions on time or the like, since the quantity of drainage to be processed is quite large. Pollution of water sources by such plant drainage is one of serious environmental issues. Furthermore, recent worsening pollution of raw water causes an increase in the quantity of chlorine and hypochlorous acid used in the sterilization process, thereby causing deterioration in taste and smell of city water.

BRIEF SUMMARY OF THE INVENTION

The present invention has been made with the aim of solving the above problem, and an object thereof is to provide a water purifying apparatus which can purify water at a high speed without using a chlorine family chemical substance, by dipping in polluted water and vibrating or rotating an end portion of a glass container in which negatively charged grains of Si, SiOx ($0<x\leq2$), minerals, Al, P, Ge, Sn, Pb, Ni or Fe are contained. Herein, "negatively charged" grains mean grains having negative electric charge or having a negative static electricity, which can also be defined as "negatively ionized" grains. The SiOx which is an oxide of Si is not limited to SiO or $SiO_2$, and the "x" may represent a value with a decimal point. Existence of such an oxide has been disclosed in a thesis titled "Characteristics of SiO-Desposited Films" written by Koichi Nagami.

A water purifying apparatus according to the present invention comprises: a case; a glass container, in which negatively charged grains of Si, SiOx ($0<x\leq2$), minerals, Al, P, Ge, Sn, Pb, Ni or Fe are contained, provided at an end portion of the case; and a driving unit for causing the glass container to vibrate or to rotate around an axis thereof.

It is generally well known that a negative charge activates cells and blood, and realizes favorable whole body effects such as a hypnotic effect and enhanced appetite, as well as physiological effects including a reduction in blood pressure and blood sugar, expansion of blood vessels, promotion of urination and the like. In addition, a negative charge activates surrounding elements, and activates oxygen to provide a similar effect to that of ozone in a case where the negative charge is in water.

The water purifying apparatus described above is provided with a glass container in which negatively charged Si or the like is contained, and a negative charge is emitted from the glass container. When the negative charge is supplied in polluted water, a positive charge carried by contaminants in the water is neutralized, and the water will further be negatively charged. Accordingly, the negative charge can eliminate the contaminants in the water and also purify the water by making poisonous fungi in the water harmless.

In the water purifying apparatus described above, the glass container may be of either a cylindrical or substantially conical shape, with an end thereof formed in one of a conical, curved, plain and spherical shape.

In such a water purifying apparatus, since the glass container in which negatively charged Si or the like is contained is of a cylindrical or substantially conical shape, the directivity of a negative charge emission is improved. In a case where the glass container is of a cylindrical shape, the directivity of negative charge emission is improved by an end portion of the glass container formed in a conical shape.

The water purifying apparatus described above may further comprise a cylindrical metal member for coating the outer circumferential surface of the glass container.

The water purifying apparatus can further improve a water purifying effect owing to the effect of the metal member coating the outer circumferential surface of the glass container in which negatively charged Si or the like is contained, in addition to emission of the negative charge from the glass container.

The water purifying apparatus according to the invention may further comprise a plurality of types of metal plates for coating the outer circumferential surface of the glass container, aligned in a circumferential direction of the glass container.

In such a water purifying apparatus, a weak current (ionic current) is generated between the metal plates because of a difference in the ionization tendencies of the plurality of types of metal plates coating the glass container in which negatively charged Si or the like is contained, aligned in a circumferential direction thereof. The ionic current is capable of exterminating contaminants in the polluted water. Therefore, the water purifying effect is further improved because of generation of the ionic current, in addition to emission of the negative charge from the glass container.

The water purifying apparatus according to the invention may further comprise in the above-mentioned glass container a glass container smaller than the above-mentioned glass container, in which negatively charged grains of Si, SiOx ($0<x\leq2$), minerals, Al, P, Ge, Sn, Pb, Ni or Fe are contained.

In the case of such a water purifying apparatus, the surface area of the glass from which the negative charge is emitted becomes greater as a result of disposing in the glass container a smaller glass container in which negatively charged Si or the like is contained. The water purifying effect is therefore further improved.

In the water purifying apparatus according to the invention, the negatively charged grains of Si, SiOx ($0<x\leq2$), minerals, Al, P, Ge, Sn, Pb, Ni or Fe may be produced through a first step of leaving Si, SiOx ($0<x\leq2$), minerals, Al, P, Ge, Sn, Pb, Ni or Fe grains at rest in a place where a static electricity reducing/eliminating apparatus including a glass container in which negatively charged grains of Si or SiOx ($0<x\leq2$) are contained is buried underground; and a second step of sintering the Si, SiOx ($0<x\leq2$), minerals, Al, P, Ge, Sn, Pb, Ni or Fe grains processed through the first step, for a predetermined time in the same place as the first step.

Moreover, in the water purifying apparatus according to the invention, the negatively charged grains of Si, SiOx ($0<x\leq2$), minerals, Al, P, Ge, Sn, Pb, Ni or Fe may be produced through a first step of introducing Si, SiOx ($0<x\leq2$), minerals, Al, P, Ge, Sn, Pb, Ni or Fe grains into a negatively charged quartz crucible; and a second step of sintering the Si, SiOx ($0<x\leq2$), minerals, Al, P, Ge, Sn, Pb, Ni or Fe grains processed through the first step, for a predetermined time in a place where a static electricity reducing/eliminating apparatus including a glass container in which negatively charged grains of Si or SiOx ($0<x\leq2$) are contained is buried underground.

Furthermore, in the water purifying apparatus according to the invention, the negatively charged grains of Si, SiOx ($0<x\leq2$), minerals, Al, P, Ge, Sn, Pb, Ni or Fe may be produced through a step of leaving Si, SiOx ($0<x\leq2$), minerals, Al, P, Ge, Sn, Pb, Ni or Fe grains at rest in a place where a static electricity reducing/eliminating apparatus including a glass container in which negatively charged grains of Si or SiOx ($0<x\leq2$) are contained is buried underground.

In these water purifying apparatuses, Si or the like is kept at rest in a place where a static electricity reducing/eliminating apparatus is buried or introduced into a negatively charged quartz crucible, and therefore the Si or the like will bear a negative charge since the negative charge is transferred to Si or the like. Furthermore, by further sintering the Si or the like in the same place where the static electricity reducing/eliminating apparatus is buried, the negative charge is fixed to the Si or the like and chronological reduction of the negative charge is restrained. The water purifying apparatus comprising a glass container enclosing such Si or the like bearing a negative charge, or for which a negative charge is fixed, efficiently emits the negative charge into water and purifies the water.

The above and further objects and features of the invention will more fully be apparent from the following detailed description with accompanying drawings.

BRIEF DESCRIPTION OF THE SEVERAL VIEWS OF THE DRAWINGS

FIG. 15A through FIG. 15E are side views showing different shapes of the glass container according to the first and second embodiments of the invention.

DETAILED DESCRIPTION OF THE INVENTION

Figure 1:
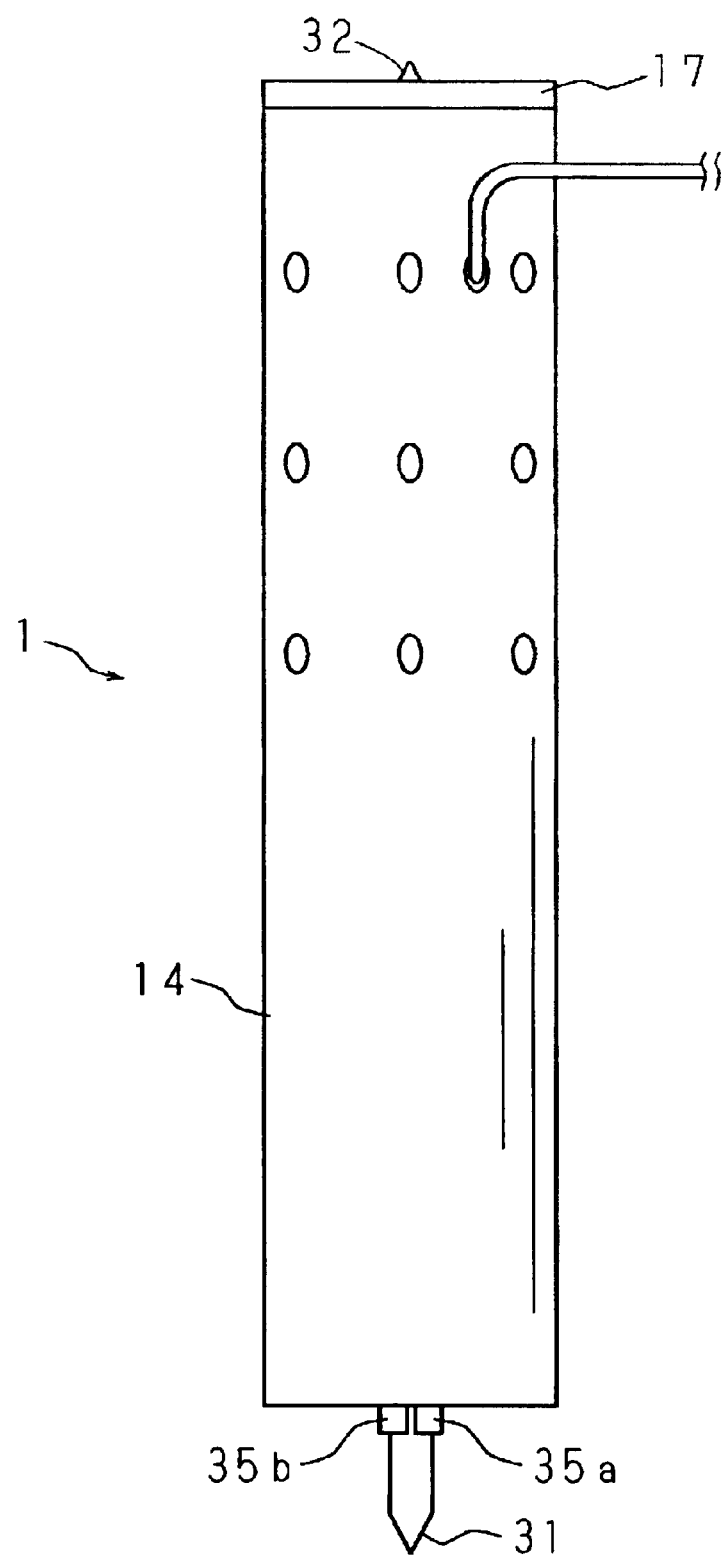
FIG. 1 is a side view showing a water purifying apparatus according to the first embodiment of the present invention.
Figure 2:
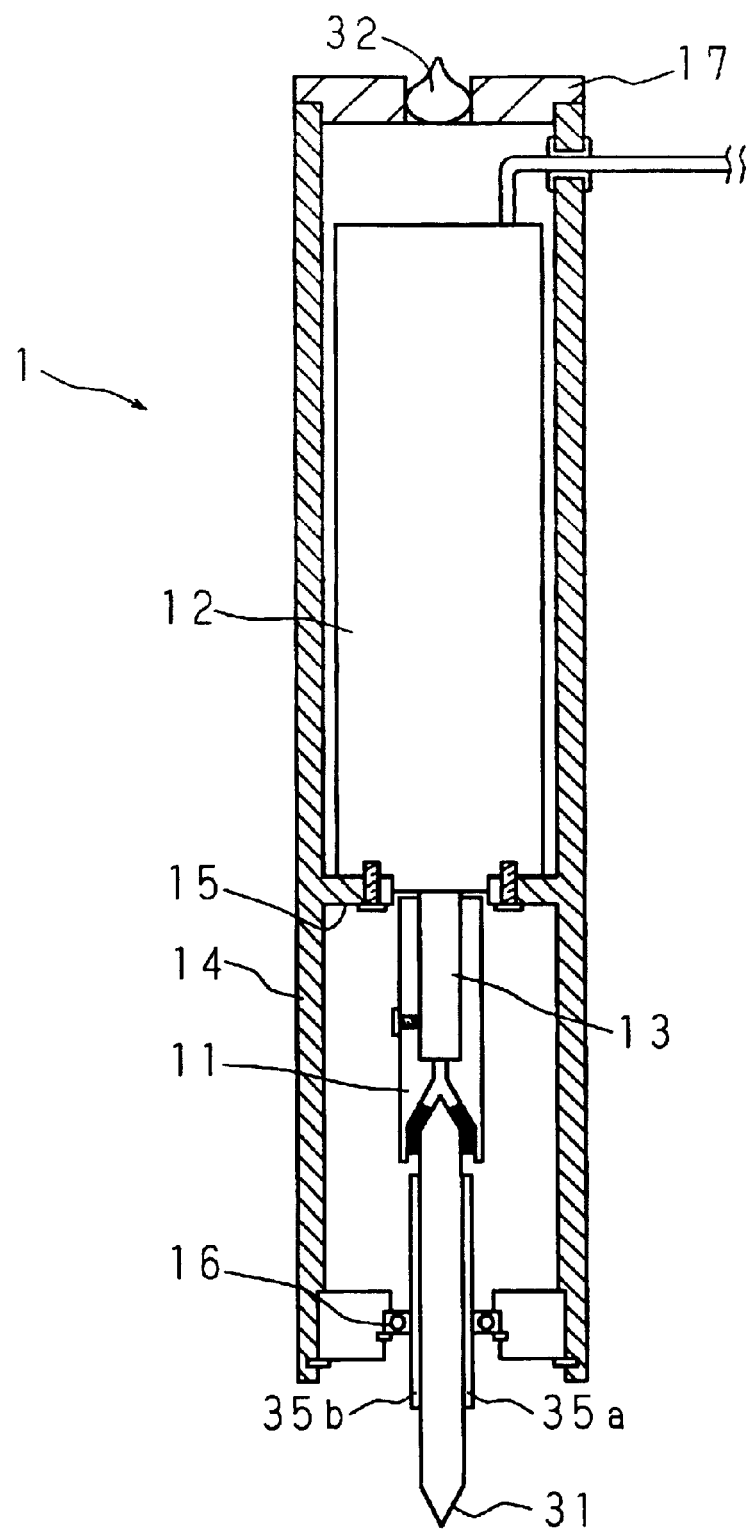
FIG. 2 is a cross-sectional view of the water purifying apparatus according to the first embodiment of the invention.

The following description will explain the present invention in detail with reference to the drawings illustrating some embodiments thereof First Embodiment FIG. 1 is a side view showing a water purifying apparatus according to the first embodiment of the present invention and FIG. 2 is a cross-sectional view thereof. The reference numeral 1 in the figures stands for the water purifying apparatus.

The water purifying apparatus 1 is provided with a cylindrical glass container 31, a glass container supporting unit 11 for supporting the glass container 31, a motor 12, and a cylindrical storing unit 14 made of an aluminum alloy according to JIS17S which houses the glass container 31, glass container supporting unit 11 and the motor 12.

A disc-shaped motor attachment plate 15 with an opening at a substantially central portion thereof is placed inside the storing unit 14 at a substantially central position along a longitudinal direction thereof. The motor 12 is fixed with screws to a surface of the motor attachment plate 15 in such a manner that a rotary shaft 13 attached to the motor 12 is protruding in a direction of the other side of the motor attachment plate 15. With the rotary shaft 13 the glass container supporting unit 11 is combined, which supports the glass container 31 with an end portion thereof protruding from an end of the storing unit 14. The glass container 31 is supported by a bearing 16 attached in the proximity of the end portion of the storing unit 14, so that the glass container 31 can rotate on an axis thereof. A disc-shaped cover section 17 is attached to the other end portion of the storing unit 14, and an auxiliary glass container 32 is attached to the cover section 17.

The motor 12 (a DC brushless motor Model EC45 manufactured by Maxon Japan Co., Ltd., output 250W, input DC 36V, rotation speed 11000 rpm (no-load speed), torque 3.09 kg·cm at 5000 rpm) is provided with a power supply cord to be connected with a DC adapter.

Figure 3A:
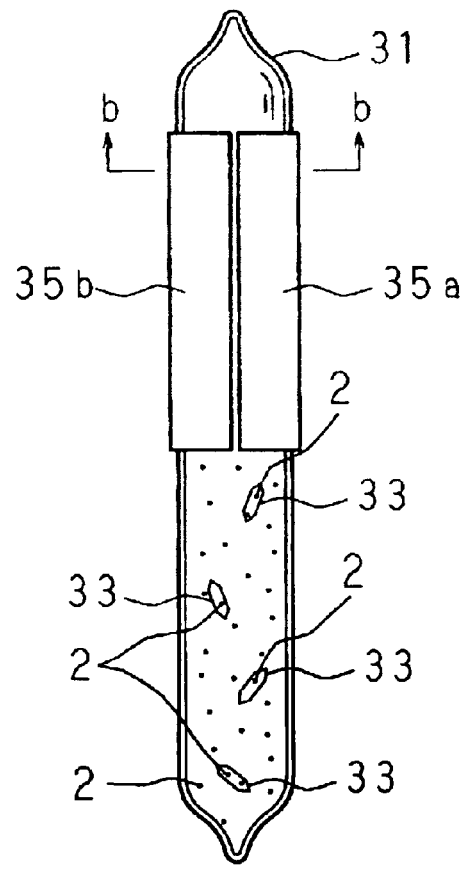
FIG. 3A is a side view showing a glass container.
Figure 3B:
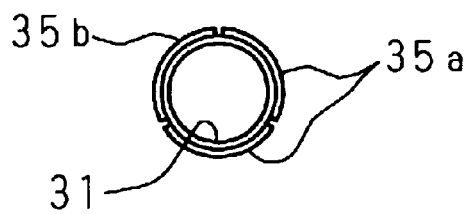
FIG. 3B is a cross-sectional view of the glass container.

FIG. 3A is a side view of the glass container 31, and FIG. 3B is a cross-sectional view thereof. The both ends of the glass container 31 are closed and formed in a conical shape, and negatively charged metallic silicon 2 and thirty smaller glass containers 33, 33 . . . containing negatively charged metallic silicon 2 are contained in the glass container 31. The glass container 31 is 10 mm in diameter and 100 mm in length. Moreover, the smaller glass containers 33, 33 . . . are of a substantially downscaled shape of the glass container 31, and have a diameter of 3 mm and a length of 8 mm. The number of smaller glass containers 33, 33 . . . contained in the glass container 31 is not limited to thirty, but may be another appropriate number. Further, the invention may be constructed without smaller glass containers 33, 33 . . . .

The outer circumferential surface of the glass container 31 is coated with two copper plates 35a and 35a and an aluminum plate 35b, all of which are 50 mm in length and 0.3 mm in thickness and aligned in a circumferential direction of the glass container 31. It should be noted that a copper plate 35a and two aluminum plates 35b and 35b may also be aligned along the outer circumferential surface of the glass container 31, or two each or three or more each of copper plates and aluminum plates of approximately 50 mm in length may also be alternately aligned. Referring to the kinds of metal plates to be coated provided on the outer circumferential surface of the glass container 31, copper and aluminum may be employed in this embodiment since these are stable at a normal temperature and have a large difference in ionization tendency therebetween. However, this is not the only possible combination and other appropriate kinds of metals can also be adopted.

Figure 4A:
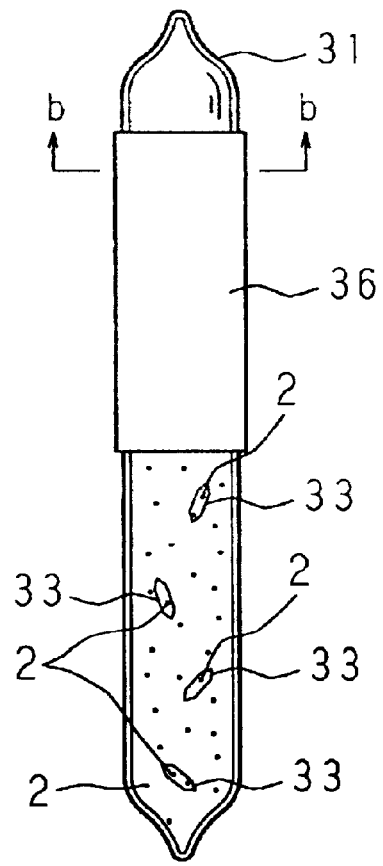
FIG. 4A is a side view showing a glass container.
Figure 4B:
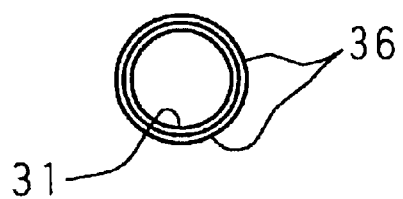
FIG. 4B is a cross-sectional view of the glass container.

Further, as shown in the side view of FIG. 4A and cross-sectional view of FIG. 4B, the outer circumferential surface of the glass container 31 may also be coated with a metal cylinder 36 of approximately 50 mm in length made of either copper or aluminum. Regarding the metal cylinder 36 also, although copper or aluminum is employed in this embodiment because of its stability at normal temperatures, the material is not limited to these but can also be another suitable metal.

Moreover, the length of the copper plate 35a, aluminum plate 35b and metal cylinder 36 is not limited to 50 mm but can be another appropriate value, including a length that covers substantially the entire outer circumferential surface of the glass container 31.

Furthermore, the invention may be constructed with the outer circumferential surface of the glass container 31 which is not coated with a metal (such as a copper plate 35a, aluminum plate 35b or metal cylinder 36).

Figure 5:
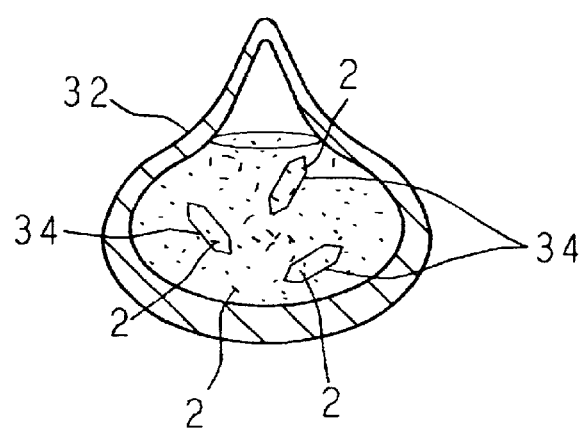
FIG. 5 is a side view showing an auxiliary glass container.

FIG. 5 is a side view showing an auxiliary glass container 32. The auxiliary glass container 32 is formed in a Welsh onion flower shape, and is 10 mm in diameter and 10 mm in height. Similar to the glass container 31, negatively charged metallic silicon 2 and five smaller glass containers 34, 34 . . . containing the negatively charged metallic silicon 2 are contained in the auxiliary glass container 32. The smaller glass containers 34, 34 . . . are of a substantially downscaled shape of the glass container 31, and have a diameter of 3 mm and length of 5 mm. The number of smaller glass containers 34, 34 . . . enclosed in the auxiliary glass container 32 is not limited to five, but can be another appropriate quantity.

The metallic silicon 2 to be contained in the glass container 31, smaller glass containers 33, 33 . . . , auxiliary glass container 32 and smaller glass containers 34, 34 . . . is negatively charged through the following process.

Figure 6:
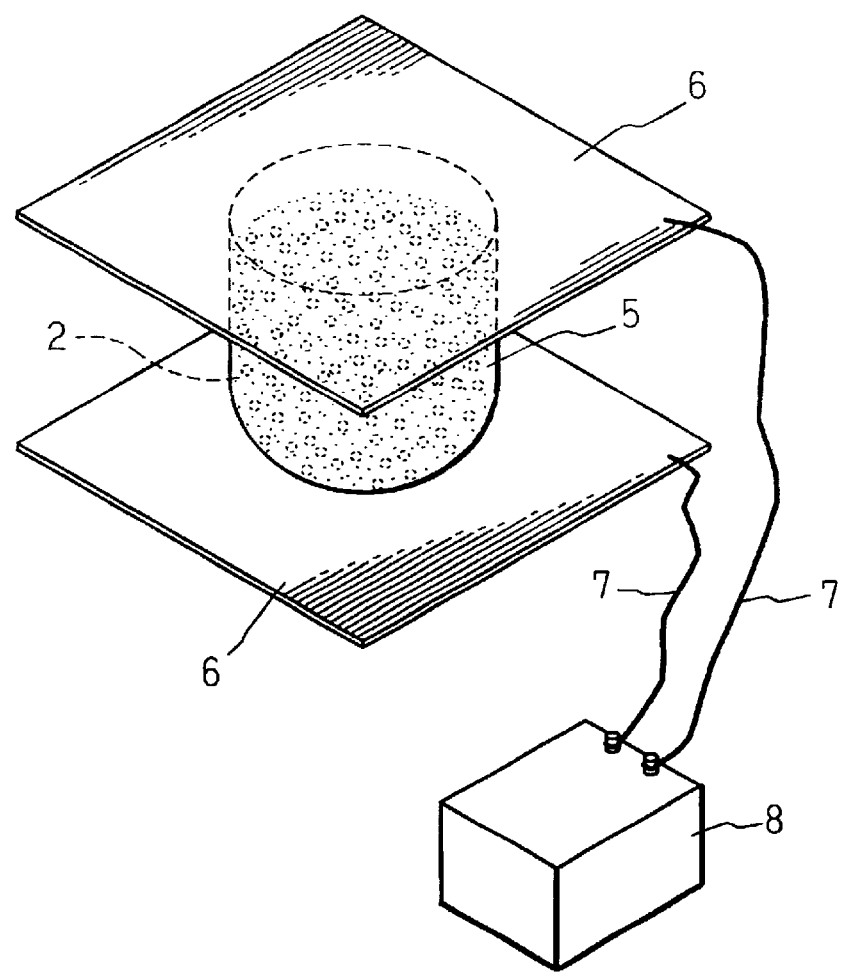
FIG. 6 is a perspective view showing a negative charge supplying device to be applied to manufacturing of the water purifying apparatus according to the invention.

FIG. 6 is a perspective view showing a negative charge supplying device to be applied to manufacturing of the water purifying apparatus according to the invention.

The negative charge supplying device is provided with a quartz crucible 5, copper plates 6, cords 7 and a static electricity reducing/eliminating apparatus 8. The quartz crucible 5 has an inner diameter of approximately 40 cm at its open face and a height of approximately 40 cm, and an open side outer edge section and a bottom section of the quartz crucible 5 are, respectively, connected with the static electricity reducing/eliminating apparatus 8 through the copper plates 6 and the cords 7.

The static electricity reducing/eliminating apparatus 8 is disclosed in Japanese Patent Application Laid-Open No. 11-87086 (1999). In the static electricity reducing/eliminating apparatus 8, a motor is driven to cause an ion bar connected therewith to rotate in a predetermined direction, so that static electricity is generated by friction between the surface of the ion bar and a cloth disposed in direct contact with the ion bar, to consequently create a potential difference between the cords connected with the apparatus 8.

After actuating the static electricity reducing/eliminating apparatus 8 to act on the quartz crucible 5 for approximately three hours so that positive static electricity is substantially eliminated from the quartz crucible 5, 1 kg of metallic silicon 2 of 99.5% of silicon purity (grain diameter 0.2 mm to 5 mm) is introduced into the quartz crucible 5 through the open side and kept therein for a predetermined time (3 to 15 minutes) with the static electricity reducing/eliminating apparatus 8 actuated, so that the metallic silicon 2 becomes negatively charged.

Then the metallic silicon 2 is sintered.

Figure 7:
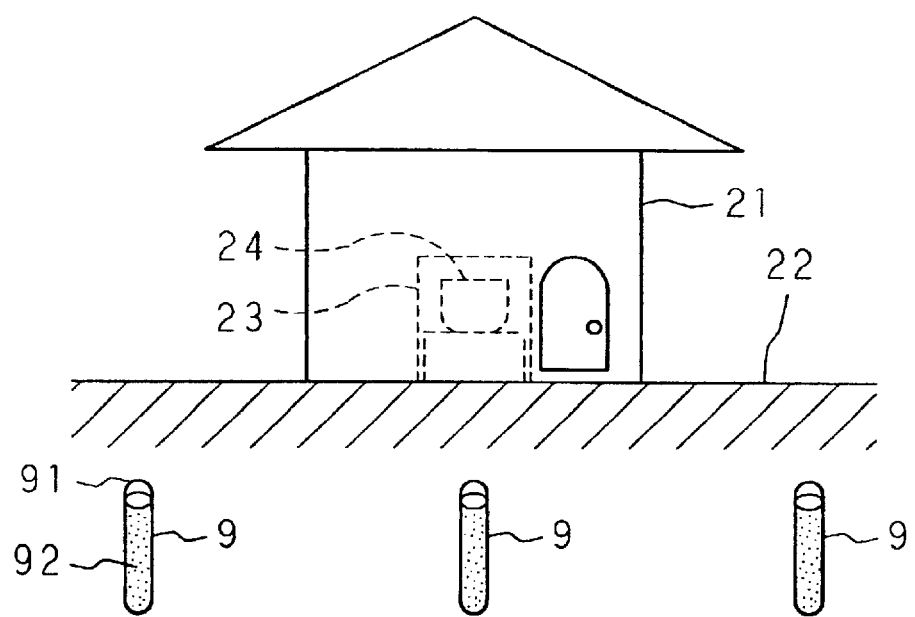
FIG. 7 is a side view showing a building and a site where metallic silicon is sintered.
Figure 8:
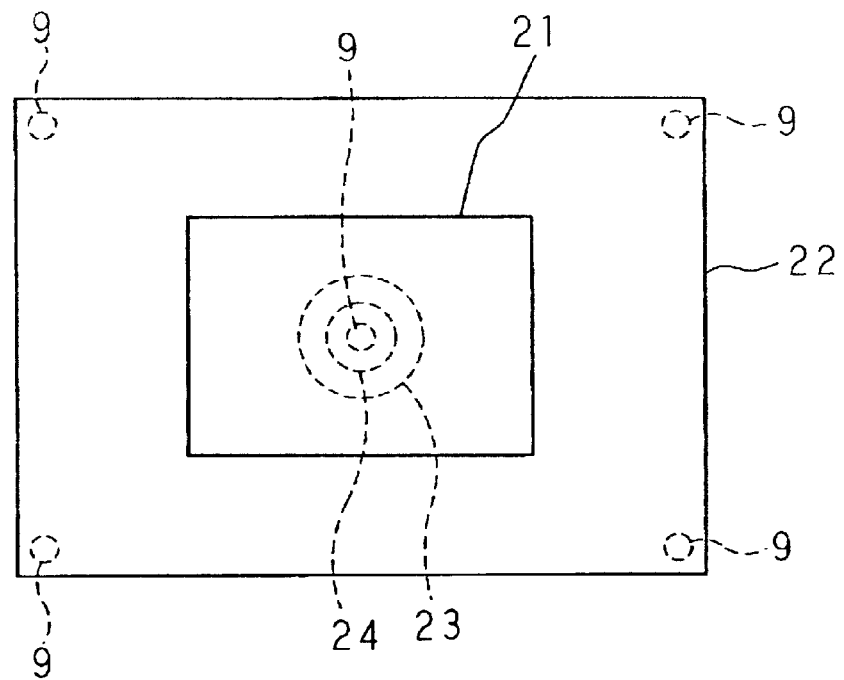
FIG. 8 is a plan view showing the building and a site where metallic silicon is sintered.

FIG. 7 is a side view showing a building and a site where metallic silicon 2 is sintered, and FIG. 8 is a plan view thereof. A building 21 (bottom area 3.6 meters×9.0 meters) is located at a central portion of a site 22 of an area of approximately 330 square meters. At the four corners and the center (the center of the building 21) of the site 22, ion bars 9 (Japanese Patent No.2896762) consisting of a sealed glass tube 91 of 8 cm in diameter and 1.5 meters in length in which 5 to 6 kg of particulate or powdery Si 92 is contained are buried underground at a depth of 5 meters with a longitudinal direction thereof vertically aligned. An electric furnace 23 is installed at a central portion of the building 21.

Under such circumstances, the negatively charged metallic silicon 2 is transferred from the quartz crucible 5 to a china crucible 24, which is then placed in the electric furnace 23 to be sintered at 800 to 1300° C. for 30 minutes to 2 hours. The crucible 24 has a diameter of 30 cm at its bottom section and a height of 20 cm. The crucible 24 is also negatively charged in advance through a similar process to the quartz crucible 5. After sintering, the metallic silicon 2 becomes one of red, blue, green, yellow, purple or burgundy color.

Length and diameter of the glass tube 91 of the ion bar 9, and amount of Si 92 may be appropriately determined according to dimensions of the building 21 and the site 22 and the like. Position and depth to bury the ion bar 9 and number of ion bars 9 may also be suitably determined according to dimensions and configuration of the building 21 and the site 22 and the like.

Moreover, in this embodiment Si 92 is contained in the glass tube 91, while SiOx can also be contained. In this case, it is preferable that a value of "x" enters the equation $1.0 < x \leq 2.0$.

Furthermore, the metallic silicon 2 may be left at rest in the site 22 for a period of one day to one week instead of using the negative charge supplying device of FIG. 6, and may further be sintered after the process of leaving at rest.

An electrostatic potential in proximity of the glass container 31 was measured to examine emission of a negative charge from the glass container 31 in which the metallic silicon 2 that has been negatively charged in the foregoing process and smaller glass containers 33, 33 . . . containing the metallic silicon 2 negatively charged in a similar way are contained.

A static electricity measuring device (Model FMX002 manufactured by Serumi Medical Instruments Co., Ltd., measuring range 0 to 20 kV) was placed at 1 cm from the protruding end portion of the glass container 31, to measure the electrostatic potential. The electrostatic potential in the room where the measurement was executed was also measured. As a result, the electrostatic potential of the room was 0.0 kV to 0.2 kV and that of the glass container 31 in an immobile state was −0.01 kV to −0.02 kV, while that of the glass container 31 during rotation was −0.01 kV to −0.03 kV. Therefore, it has been proven that a negative charge is emitted from the glass container 31, and that a greater amount of negative charge is emitted from the glass container 31 when the glass container 31 is rotating than when the glass container 31 is not in motion.

Then quality of polluted water was chronologically examined during use of the water purifying apparatus 1. Pack Test manufactured by Kyoritsu Chemical-Check Lab. Corp. was employed to measure chemical oxygen demand (hereinafter referred to as "COD"), which is an index of water quality that shows the amount of impurities contained in water. The Pack Test is based on an alkaline process according to JIS K0102-19., by which a consumption process of potassium permanganate through oxidation and decomposition by impurities in water during five minutes at a normal temperature is represented by variation of colors, and a value of COD is calculated according to the color variation. The measuring range of the COD value is 0 to 100 mg per liter.

As an object of measurement, polluted water was prepared in which fertilizer mainly composed of nitrogen, phosphorus and potassium, water adhesive for woodcrafts, iron rust, metal polishing solution, copper fragments and workshop drainage are mixed with city water so that the COD value becomes 100 mg or less per liter.

Figure 9A:
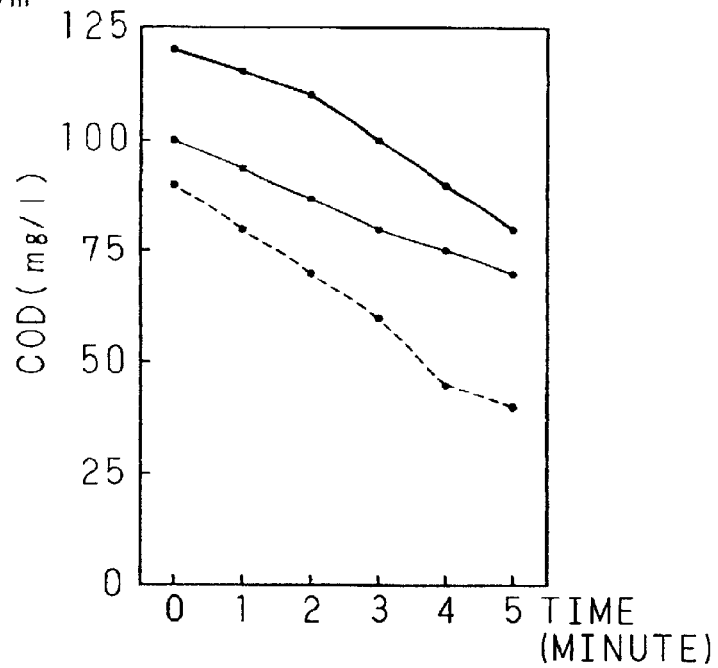
FIGS. 9A and 9B are graphs showing chronological variations of the chemical oxygen demand of water processed by the water purifying apparatus according to the first embodiment of the invention.
Figure 9B:
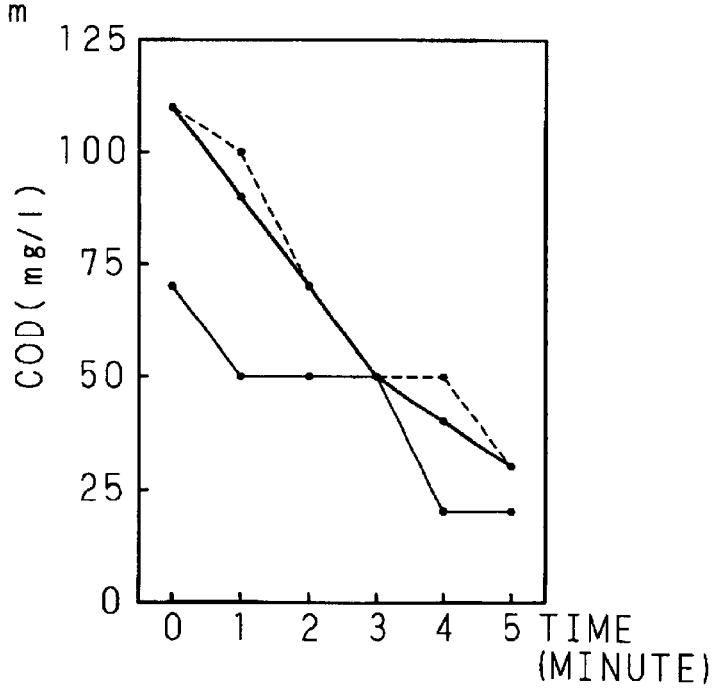

300 cc of polluted water having an adjusted initial COD value was put in a beaker and the water purifying apparatus 1 was set in such a manner that the end portion of the glass container 31 protruding from the storing unit 14 is dipped in the polluted water. In such a condition the glass container 31 was rotated and a COD value of the polluted water was measured at intervals of one minute. FIG. 9A shows measurement results of three kinds of polluted water with different initial COD values after rotating the glass container 31 at 2700 rpm (low speed). Moreover, FIG. 9B shows measurement results of three kinds of polluted water with different initial COD values after rotating the glass container 31 at 8000 rpm (high speed).

According to the results, polluted water of a lower initial COD value showed a similar reduction of COD value after both low and high speed rotation of the glass container 31. Meanwhile, polluted water of a higher initial COD value showed a greater reduction of the COD value after high speed rotation of the glass container 31 than after low speed rotation of the same. Consequently, it has been proven that a higher speed rotation of the glass container 31 has a greater effect of dissolving contaminants against polluted water of a higher initial COD value.

Further, it has also been proven that the water purifying apparatus 1 according to the invention not only reduces a COD value in polluted water, in other words dissolves contaminants, but also makes poisonous fungi in the polluted water harmless.

Figure 10A:
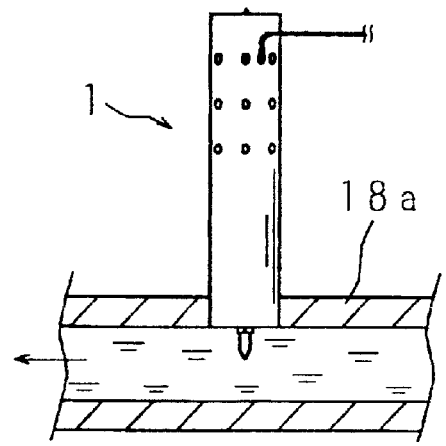
FIG. 10A through FIG. 10C are schematic drawings showing installation examples of the water purifying apparatus according to the first embodiment of the invention.
Figure 10B:
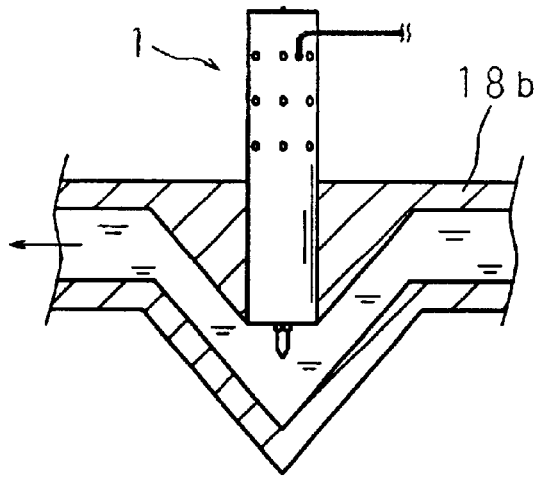
Figure 10C:
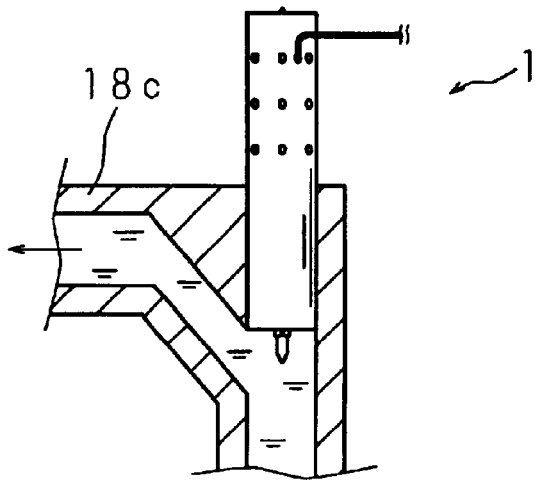

The water purifying apparatus 1 which can purify water as described above can effectively perform a purifying effect when installed at an appropriate place. For example, as shown in FIG. 10A through FIG. 10C, the water purifying apparatus may be installed on a pipe such as a plant drain pipe, city water pipe or water supply pipe in a building, in such a manner that the end portion of the glass container 31 is directed downward and dipped in water flowing through the pipe. FIG. 10A is a schematic drawing of a state where the water purifying apparatus 1 is installed on a horizontal pipe 18a. By opening a hole at a part of the pipe 18a and installing the water purifying apparatus 1 thereon, water horizontally flowing through the pipe 18a can be purified.

FIG. 10B is a schematic drawing of a state where the water purifying apparatus 1 is installed on a pipe 18b which has a substantially V-shaped section. A hole is made on the substantially V-shaped section of the pipe 18b so as to oppose the peak of the V-shape. The water purifying apparatus 1 installed on such a hole can purify water which temporarily stagnates at the turning point of the V-shape on its way along the substantially V-shaped configuration of the pipe 18b. FIG. 10C is a schematic drawing of a state where the water purifying apparatus 1 is installed on a pipe 18c that has a corner section turning from a vertical part to a horizontal part. By making a hole at the corner section of the pipe 18c and installing the water purifying apparatus 1 thereon, water flowing from the lower section toward the left hand direction according to the drawing can be purified at the turning point in the process.

Figure 11:
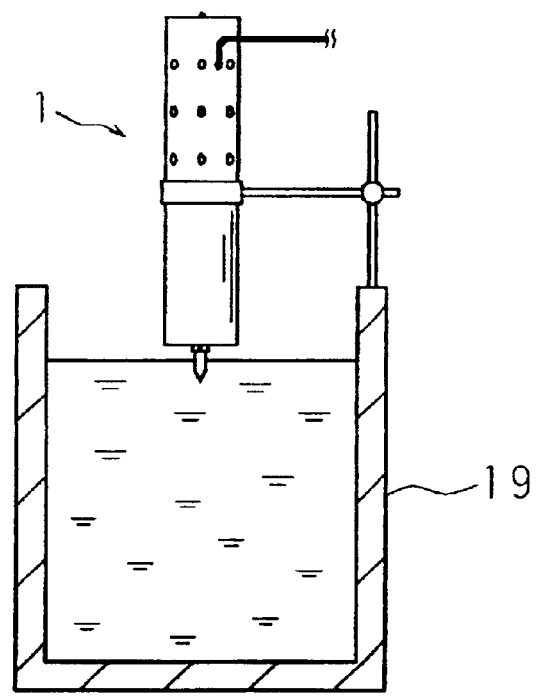
FIG. 11 is a schematic drawing showing an installation example of the water purifying apparatus according to the first embodiment of the invention.

Furthermore, as shown in FIG. 11, when the water purifying apparatus 1 is fixed to a reservoir 19 installed in a plant or the like, water pooled in the reservoir 19 can be purified.

Second Embodiment

Figure 12:
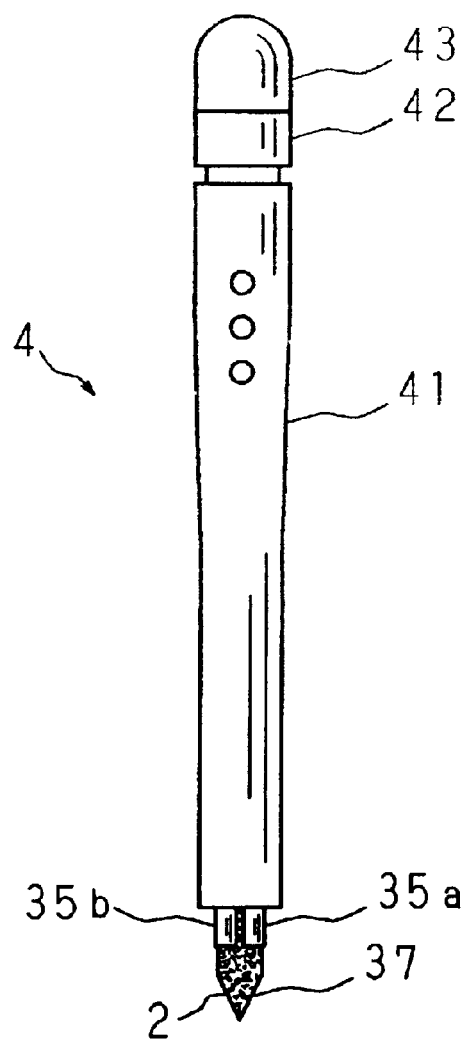
FIG. 12 is a side view showing a water purifying apparatus according to the second embodiment of the invention.
Figure 13:
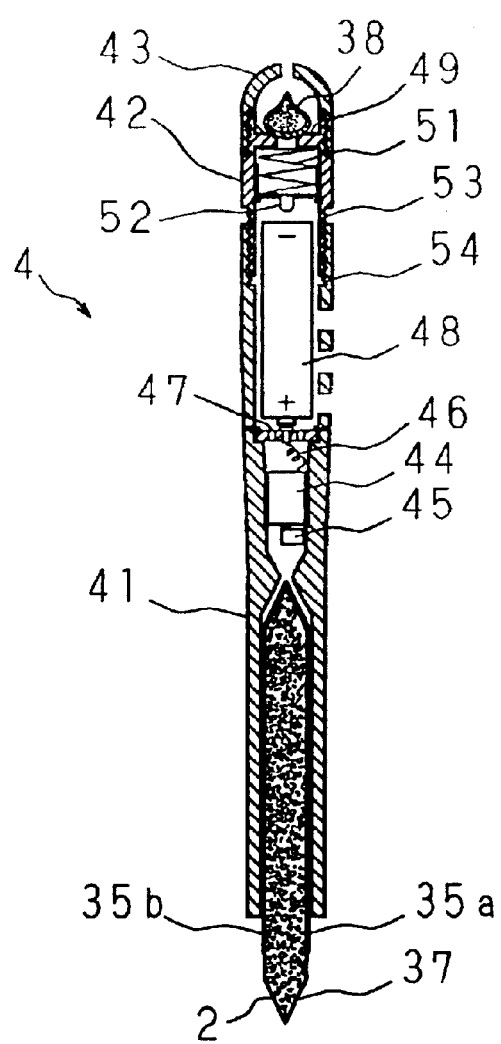
FIG. 13 is a cross-sectional view of the water purifying apparatus according to the second embodiment of the invention.

FIG. 12 is a side view showing a water purifying apparatus according to the second embodiment of the invention and FIG. 13 is a cross-sectional view thereof. The numeral 4 in the figures indicates the water purifying apparatus. In the water purifying apparatus 4 of the second embodiment, a cylindrical glass container 37 is caused to vibrate. In these drawings, identical components to those in FIG. 1 are represented by identical numerals.

A cylindrical case of the water purifying apparatus 4 is composed of a first body section 41 in which the glass container 37 and a motor 44 (manufactured by Namiki Precision Jewel Co., Ltd., input 1.5V to 3V, rotation speed approximately 4500 rpm) are stored, a second body section 42 to which an auxiliary glass container 38 is attached and a cap 43 for protecting the auxiliary glass container 38. The cap 43 has a hole at an end portion thereof.

The glass container 37 is stored in the first body section 41 with an end portion of the glass container 37 protruding from an end of the first body section 41. The motor 44 and an eccentric dead-weight section 45 connected to the motor 44 are stored at a substantially central section of the first body section 41. To the inner face at the other end of the first body section 41, an anode contact section 47 is attached which is connected with the motor 44 through a lead wire 46, and a dry cell 48 (size AA, 1.5V) is stored with an anode thereof contacting the anode contact section 47.

The second body section 42 includes therein a disc-shaped cathode contact section attachment plate 49, to a face of which a cathode contact section 52 is attached through a spring 51. Moreover, to the other face of the cathode contact section attachment plate 49 the auxiliary glass container 38 of a Welsh onion flower shape is attached.

An internal thread 54 is provided on the inner circumferential surface of an end portion of the first body section 41, and an external thread 53 is provided on the outer circumferential surface of an end portion of the second body section 42, so that when the second body section 42 is turned clockwise the cathode contact section 52 attached inside the second body section 42 comes in contact with the cathode of the dry cell 48, to supply power to the motor 44.

The glass container 37 and the auxiliary glass container 38 included in the water purifying apparatus 4 according to the second embodiment are formed in a similar shape to that of the glass container 31 and the auxiliary glass container 32 of the first embodiment. In the glass container 37 and the auxiliary glass container 38 according to the second embodiment, only the negatively charged metallic silicon 2 is contained, however, the smaller glass containers 33, 33 . . . and smaller glass containers 34, 34 . . . of the first embodiment containing the negatively charged metallic silicon 2 may also be contained.

The glass container 37 is 10 mm in diameter and 100 mm in length. The outer circumferential surface of the glass container 37 is, similarly to the glass container 31 of the first embodiment, coated with two copper plates 35a and 35a and an aluminum plate 35b aligned in a circumferential direction of the glass container 37. Moreover, similarly to the first embodiment, the outer circumferential surface of the glass container 37 may be coated with a copper plate 35a and two aluminum plates 35b and 35b, or with two or more each of copper plates and aluminum plates alternately aligned, or with a metal cylinder 36 made of either copper or aluminum. Furthermore, the outer circumferential surface of the glass container 37 does not necessarily have to be coated with metal such as a copper plate 35a and an aluminum plate 35b, metal cylinder 36 or the like.

The quality of polluted water was chronologically examined during use of the water purifying apparatus 4. The same polluted water as that used for a quality examination in the first embodiment was used. The protruding end portion of the glass container 37 was dipped in the polluted water and the glass container 37 was caused to vibrate. COD values representing the water quality were measured by the same Pack Test as that of the first embodiment. As a result, an initial COD value of 90 mg per liter at 0 minutes (start of vibration) was lowered to 60 mg per liter after 5 minutes of vibration. Such a result has proven that the water purifying apparatus 4, as the water purifying apparatus 1 of the first embodiment, is capable of reducing COD of polluted water, in other words dissolving contaminants in the polluted water. Further, it has also been proven that the water purifying apparatus 4 not only dissolved contaminants in polluted water, but also makes poisonous fungi in the polluted water harmless.

Third Embodiment

Figure 14:
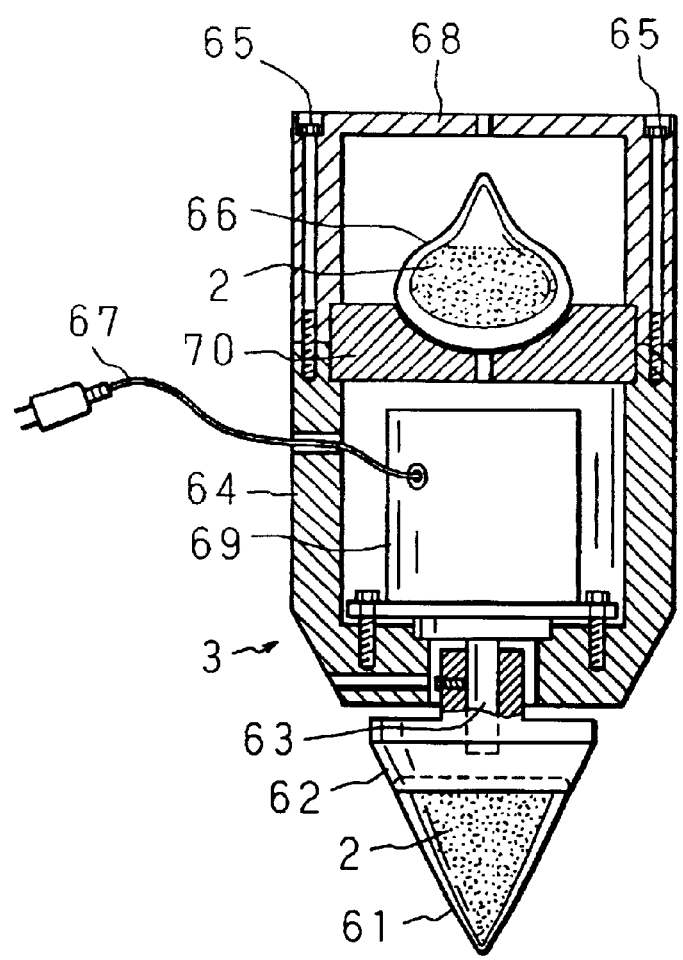
FIG. 14 is a cross-sectional view of a water purifying apparatus according to the third embodiment of the invention.

FIG. 14 is a cross-sectional view showing a water purifying apparatus according to the third embodiment of the invention. The numeral 3 in the figure indicates the water purifying apparatus. In the water purifying apparatus 3 of the third embodiment, a conical-shaped glass container 61 is caused to rotate. In the drawing, identical components to those in FIG. 1 are represented by identical numerals.

The water purifying apparatus 3 is provided with a cylindrical motor storing unit 64 in which a motor 69 (Model 41K40A-B manufactured by Oriental Motor Co., Ltd., output 40W, rating torque 1.35 kg·cm, rated speed 2900 rpm) is fixed with screws. A power supply cord 67 is connected with the motor 69. An end of the motor storing unit 64 is tapered off, and at the tapered side end of the motor storing unit 64 a glass container storing unit 62 in which a bottom section of the conical-shaped glass container 61 is stored is connected with a rotary shaft 63 attached to the motor 69. The glass container 61 is 30 mm in diameter and 30 mm in height.

To the other end of the motor storing unit 64, a cover section 68 is attached with bolts 65 and 65. A disc-shaped auxiliary glass container attachment plate 70 is located between the cover section 68 and the motor 69, in parallel therewith. An auxiliary glass container 66 of a Welsh onion flower shape is attached to a surface of the auxiliary glass container attachment plate 70 opposing to the cover section 68, with a pointed portion of the auxiliary glass container 66 directed toward the cover section 68. In the glass container 61 and auxiliary glass container 66, negatively charged metallic silicon 2 is contained.

As is the case with the water purifying apparatuses 1 and 4 according to the first and second embodiments respectively, by dipping the glass container 61 of the water purifying apparatus 3 in polluted water, and causing the glass container 61 to rotate, contaminants in the polluted water can be dissolved and poisonous fungi in the polluted water can be made harmless, and thus the water can be purified.

Moreover, the outer circumferential surface of the glass container 61 of the water purifying apparatus 3 may be coated with metal. Further, smaller glass containers of an appropriate shape containing the negatively charged metallic silicon 2 may be contained in the glass container 61 and the auxiliary glass container 66.

In addition, according to the first to third embodiments, the glass container 31, smaller glass containers 33, 33 . . . and glass container 37 are of a cylindrical shape with both ends formed in a conical shape while the glass container 61 is of a conical shape, however, the shapes of the glass containers are not limited to these examples but may be other appropriate shapes. For example, the glass container 31(37) may have the shapes shown in FIG. 15A through FIG. 15E. Here, in FIG. 15A through FIG. 15E, the negatively charged metallic silicon 2 and the smaller glass containers 33, 33 . . . containing the negatively charged metallic silicon 2 contained in the glass container 31 (the negatively charged metallic silicon 2 contained in the glass container 37), copper plates 35a and 35a and an aluminum plate 35b coating the outer circumferential surface of the glass container 31(37) are omitted, so that the respective shapes of the glass container 31(37) can be prominently shown.

The glass container 31(37) in FIG. 15A is of a cylindrical shape with an end formed in a conical shape and the other end in plain surface. The glass container 31(37) in FIG. 15B is of a cylindrical shape with an end formed in a conical shape and the other end in a curved shape. The glass container 31(37) in FIG. 15C is of a cylindrical shape with both ends formed in a curved shape. The glass container 31(37) in FIG. 15D is of a cylindrical shape having plain surfaces on both ends. The glass container 31(37) in FIG. 15E is of a cylindrical shape with an end formed in a spherical shape and the other end in a conical shape.

Further, according to the first to third embodiments, the negatively charged metallic silicon 2 is contained in the glass container 31, smaller glass containers 33, 33 . . . , glass container 37 and glass container 61, however the material to be contained is not limited to metallic silicon but, for example, negatively charged silicic sand may be contained.

Furthermore, according to the first to third embodiments, the negatively charged Si or SiOx is contained in the glass container 31, smaller glass containers 33, 33 . . . , glass container 37 and glass container 61, however, the material to be contained is not limited to Si or SiOx but, for example, negatively charged minerals, Al, P, Ge, Sn, Pb, Ni, Fe or the like may also be contained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A water purifying apparatus comprising:
   a case;
   a glass container, in which negatively charged grains of material selected from the group consisting of Si, SiOx ($0<x\leq2$), minerals, Al, P, Ge, Sn, Pb, Ni and Fe are contained, provided at an end portion of the case; and
   a driving unit for causing the glass container to vibrate.

2. The water purifying apparatus according to claim 1, wherein the glass container is of one of a cylindrical shape and a substantially conical shape, with an end thereof formed in one of a conical, curved, plain and spherical shapes.

3. The water purifying apparatus according to claim 2, further comprising a cylindrical metal member for coating an outer circumferential surface of the glass container.

4. The water purifying apparatus according to claim 2, further comprising a plurality of types of metal plates for coating an outer circumferential surface of the glass container, aligned in a circumferential direction of said glass container.

5. The water purifying apparatus according to claim 1, further comprising a cylindrical metal member for coating an outer circumferential surface of the glass container.

6. The water purifying apparatus according to claim 1, further comprising a plurality of types of metal plates for coating an outer circumferential surface of the glass container, aligned in a circumferential direction of said glass container.

7. The water purifying apparatus according to claim 1, further comprising in the glass container a glass container smaller than said glass container, in which the negatively charged grains of material selected from the group consisting of Si, SiOx ($0<x\leq2$), minerals, Al, P, Ge, Sn, Pb, Ni and Fe are contained.

8. The water purifying apparatus according to claim 1, wherein the negatively charged grains of material selected from the group consisting of Si, SiOx ($0<x\leq2$), minerals, Al, P, Ge, Sn, Pb, Ni and Fe are produced through:
   a first step of leaving grains of material selected from the group consisting of Si, SiOx ($0<x\leq2$), minerals, Al, P, Ge, Sn, Pb, Ni and Fe at rest in a place where a static electricity reducing/eliminating apparatus including a glass container, in which negatively charged grains of at least one of Si and SiOx ($0<x\leq2$) are contained, is buried underground; and
   a second step of sintering the grains of said material selected from the group consisting of Si, SiOx ($0<x\leq2$), minerals, Al, P, Ge, Sn, Pb, Ni and Fe processed through the first step, for a predetermined time in the same place as the first step.

9. The water purifying apparatus according to claim 1, wherein the negatively charged grains of material selected from the group consisting of Si, SiOx ($0<x\leq2$), minerals, Al, P, Ge, Sn, Pb, Ni and Fe are produced through:
   a first step of introducing grains of material selected from the group consisting of Si, SiOx ($0<x\leq2$), minerals, Al, P, Ge, Sn, Pb, Ni and Fe into a negatively charged quartz crucible; and
   a second step of sintering the grains of said material selected from the group consisting of Si, SiOx ($0<x\leq2$), minerals, Al, P, Ge, Sn, Pb, Ni and Fe processed through the first step, for a predetermined time in a place where a static electricity reducing/eliminating apparatus including a glass container, in which negatively charged grains of at least one of Si and SiOx ($0<x\leq2$) are contained, is buried underground.

10. The water purifying apparatus according to claim 1, wherein the negatively charged grains of material selected from the group consisting of Si, SiOx ($0<x\leq2$), minerals, Al, P, Ge, Sn, Pb, Ni and Fe are produced through a process of leaving grains of material selected from the group consisting of Si, SiOx ($0<x\leq2$), minerals, Al, P, Ge, Sn, Pb, Ni and Fe at rest in a place where a static electricity reducing/eliminating apparatus including a glass container, in which negatively charged grains of at least one of Si and SiOx ($0<x\leq2$) are contained, is buried underground.

11. A water purifying apparatus comprising:
    a case;
    a glass container, in which negatively charged grains of material selected from the group consisting of Si, SiOx ($0<x\leq2$), minerals, Al, P, Ge, Sn, Pb, Ni and Fe are contained, provided at an end portion of the case; and
    a driving unit for causing the glass container to rotate around an axis thereof.

12. The water purifying apparatus according to claim 11, wherein the glass container is of one of a cylindrical shape and a substantially conical shape, with an end thereof formed in one of a conical, curved, plain and spherical shapes.

13. The water purifying apparatus according to claim 12, further comprising a cylindrical metal member for coating an outer circumferential surface of the glass container.

14. The water purifying apparatus according to claim 12, further comprising a plurality of types of metal plates for coating an outer circumferential surface of the glass container, aligned in a circumferential direction of said glass container.

15. The water purifying apparatus according to claim 11, further comprising a cylindrical metal member for coating an outer circumferential surface of the glass container.

16. The water purifying apparatus according to claim 11, further comprising a plurality of types of metal plates for coating an outer circumferential surface of the glass container, aligned in a circumferential direction of said glass container.

17. The water purifying apparatus according to claim 11, further comprising in the glass container a glass container smaller than said glass container, in which the negatively charged grains of material selected from the group consisting of Si, SiOx ($0<x\leq2$), minerals, Al, P, Ge, Sn, Pb, Ni and Fe are contained.

18. The water purifying apparatus according to claim 11, wherein the negatively charged grains of material selected from the group consisting of Si, SiOx ($0<x\leq2$), minerals, Al, P, Ge, Sn, Pb, Ni and Fe are produced through:
    a first step of leaving grains of material selected from the group consisting of Si, SiOx ($0<x\leq2$), minerals, Al, P, Ge, Sn, Pb, Ni and Fe at rest in a place where a static electricity reducing/eliminating apparatus including a glass container, in which negatively charged grains of at least one of Si and SiOx ($0<x\leq2$) are contained, is buried underground; and
    a second step of sintering the grains of said material selected from the group consisting of Si, SiOx ($0<x\leq2$), minerals, Al, P, Ge, Sn, Pb, Ni and Fe processed through the first step, for a predetermined time in the same place as the first step.

19. The water purifying apparatus according to claim 11, wherein the negatively charged grains of material selected from the group consisting of Si, SiOx (0<x≦2), minerals, Al, P, Ge, Sn, Pb, Ni and Fe are produced through:
- a first step of introducing grains of material selected from the group consisting of Si, SiOx (0<x≦2), minerals, Al, P, Ge, Sn, Pb, Ni and Fe into a negatively charged quartz crucible; and
- a second step of sintering the grains of said material selected from the group consisting of Si, SiOx (0<x≦2), minerals, Al, P, Ge, Sn, Pb, Ni and Fe processed through the first step, for a predetermined time in a place where a static electricity reducing/eliminating apparatus including a glass container, in which negatively charged grains of at least one of Si and SiOx (0<x≦2) are contained, is buried underground.

20. The water purifying apparatus according to claim 11, wherein said negatively charged grains of material selected from the group consisting of Si, SiOx (0<x≦2), minerals, Al, P, Ge, Sn, Pb, Ni and Fe are produced through a process of leaving grains of material selected from the group consisting of Si, SiOx (0<x≦2), minerals, Al, P, Ge, Sn, Pb, Ni and Fe at rest in a place where a static electricity reducing/eliminating apparatus including a glass container, in which negatively charged grains of at least one of Si and SiOx (0<x≦2) are contained, is buried underground.

* * * * *